July 25, 1933.   R. R. SEARLES   1,920,132
SPRING CONNECTION
Filed Dec. 4, 1930
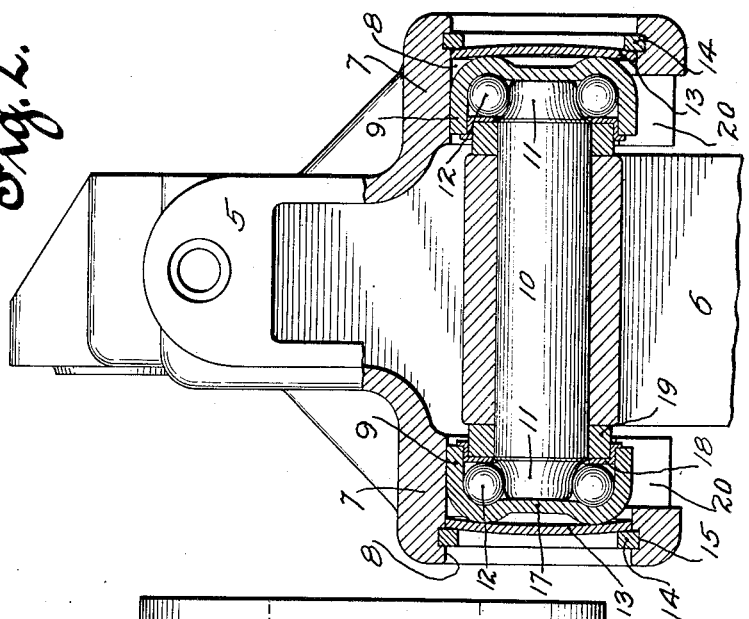
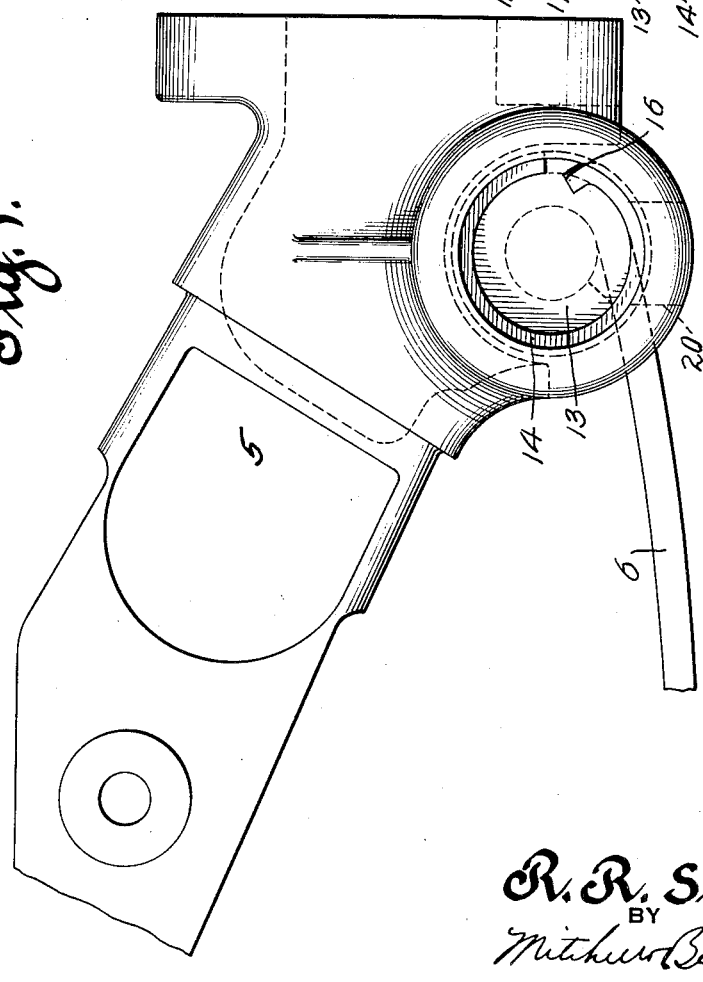
INVENTOR
R. R. Searles
BY
ATTORNEYS.

Patented July 25, 1933

1,920,132

UNITED STATES PATENT OFFICE

RAYMOND R. SEARLES, OF NEW BRITAIN, CONNECTICUT, ASSIGNOR TO THE FAFNIR BEARING COMPANY, OF NEW BRITAIN, CONNECTICUT, A CORPORATION OF CONNECTICUT

SPRING CONNECTION

Application filed December 4, 1930. Serial No. 499,929.

My invention relates to a spring connection and more particularly to an anti-friction spring connection for a so-called hinge end.

It is an object of the invention to provide a spring connection of the character indicated which will be simple in construction, cheap to manufacture, easy to assemble, and secure and sturdy in use.

It is another object to provide a spring connection of the character indicated in which certain parts need not be made with the highest degree of accuracy and yet which will function accurately in use.

Other objects will appear or will be hereinafter pointed out.

Briefly stated, in a preferred form of the invention I provide a support having a bore for receiving raceway members. Interposed between the raceway members I employ means having raceways complementary to the first mentioned raceways and preferably serving also to space the first mentioned raceways apart. Anti-friction bearing members are interposed between the complementary raceways and serve to take radial loads. The raceways are held in place by one or more resilient means.

In the drawing which shows, for illustrative purposes only, a preferred form of the invention—

Fig. 1 is a side view in elevation of a hinge end spring connection illustrating fragments of a spring and frame;

Fig. 2 is an end view in partial section of the connection shown in Fig. 1.

In said drawing 5 indicates a frame, while 6 indicates a spring to be connected thereto. The frame or support in the form shown includes spaced apart bosses 7—7, having bores 8—8 therein. In each bore is a bearing member, such as a bearing cup 9, which preferably fits the bore and is supported radially thereby. The spring 6 carries bearing means, preferably in the form of a bearing pin 10 having raceways 11—11 complementary to the raceways of said cups 9—9 and preferably formed directly on the ends of said pin. Anti-friction bearing members, such as balls 12, are interposed between the cups 9—9 and the raceways 11—11.

It is preferred to have the pin 10 engage the cups 9—9, so as to definitely space the same apart. When such cups are engaged by the ends of the pin 10 the raceways are preferably so formed that the balls or other anti-friction bearing members 12 take only radial loads, end thrusts then being taken between the engaging parts of the pin 10 and the cups 9—9.

The cups 9—9 are held in the bores resiliently so that the parts will not be unduly cramped, even though pins 10 of slightly different lengths be employed. In the form shown I employ resilient plates 13 fitting within each bore and held therein by suitable means, such as a split ring 14, fitting into an annular groove 15 formed in each bore. Clearly, one of the cups could be held solidly and the other held resiliently, and the resilient connection would extend to both cups. The split ring may have one end turned up, as indicated at 16, so as to permit a tool to be inserted for easy removal of the rings.

The anti-friction bearing members 12 are preferably unitarily carried with the cups 9—9. As illustrated, each cup is bowed up centrally, as indicated at 17, so as to form a grooved raceway, and a plate or washer 18, secured to the cup 9, serves to prevent outward displacement of the balls. A washer 19 of felt or the like may be carried by the cups or be interposed between the eye of the spring or any other suitable shoulder, for example, on the pin 10, and the plate 18, so as to effectively exclude water and dust and effectively retain lubricant on the anti-friction bearing members.

The assembly of the device is relatively simple. The pin 10 is set into the spring eye and may be a very tight friction fitting or may be positively held, as by means of a set screw, not shown. The spring eye with the pin 10 attached is then moved into the position shown in Fig. 2, the bosses 7—7 being cut away, as indicated at 20, to permit the ready insertion of the pin 10 transversely. The bearing cups 9—9 are then slid in from the ends of the bores, after which the resilient plates 13—13 may be inserted and flexed to the necessary degree and the snap rings 14 inserted to hold all of the parts in position.

The presence of the plates 13—13 not only holds the cups from outward movement or escape from the bosses but the plates likewise resist rotation of the cups by reason of the frictional engagement of said plates with said cups near the outer edges of the latter.

I have thus provided a spring connection which is quite simple in construction, easy to assemble and, due to the relatively flexibly held parts, inaccuracies in manufacture will be taken care of and yet the parts will fit as desired.

While the invention has been described in considerable detail I wish it understood that various changes and modifications may be made within the scope of the invention as defined in the appended claims.

I claim:

1. In a spring connection, a frame member having spaced apart bosses with bores therein, a spring having a bearing means projecting from opposite sides thereof and having raceways for anti-friction bearing members at the ends thereof, a pair of bearing cups within said bores and fitting over and engaging the ends of said bearing means to be thereby spaced apart, anti-friction bearing members interposed between said bearing means and said bearing cups for sustaining radial loads between said bearing means and said cups, and means for resiliently holding said bearing cups in said bores in engagement with said bearing means.

2. In a spring connection, a frame member having spaced apart bosses with bores therein, bearing cups in said bores, means interposed between said bearing cups and having raceways for anti-friction bearing members thereon, said means serving to space said bearing cups apart, anti-friction bearing members interposed between each of said bearing cups and said means, and a flexed plate secured to said frame for holding one of said bearing cups in its bore against outward escape and for resisting rotary movement of said cup in said bore.

3. In a spring connection for hingedly connecting a frame to a spring, a support, raceway members carried by said support, raceway means interposed between said raceway members and engaging the same for spacing them apart, anti-friction bearing members interposed between said raceway members and said raceway means, and means for resiliently holding said raceway members on said support.

4. In a spring connection, a supporting member having a bore therein, a bearing raceway in said bore, a second bearing raceway engaging said first mentioned raceway in said bore, and a resilient plate engaging said first mentioned raceway and held in said bore, whereby said raceways are resiliently held in engagement with each other.

5. In a spring connection, a support having a bore therein, a raceway cup in said bore, a raceway member engaging said raceway cup, anti-friction bearing members interposed between said raceway cup and said raceway member, a resilient plate in said bore and engaging said raceway cup for resiliently urging said cup into engagement with said raceway member, and a split ring fitting a groove in said bore and holding said resilient plate in place.

6. In a spring connection, a frame having spaced apart bosses with bores therein, bearing cups in said bores, a bearing pin interposed between said bearing cups and engaging the same for spacing the latter apart, said bearing pin having raceways formed directly thereon, anti-friction bearing members interposed between the raceways on said bearing pin and said bearing cups, a resilient plate engaging each of said bearing cups for holding the latter in resilient engagement with said bearing pin, each of said bores having a groove therein, and a split ring in each of said grooves and engaging said resilient plates for holding the same in place.

7. In a spring connection, a support for raceway members, raceway means complementary to said raceway members, anti-friction bearing members interposed between said raceway members and said raceway means, a resilient plate engaging one of said raceway members, means for holding the other of said raceway members against axial movement, said plate being flexed to hold said raceway members resiliently in place, and means for securing said resilient plate to said support.

RAYMOND R. SEARLES.